United States Patent
Diamant et al.

(10) Patent No.: US 10,943,013 B2
(45) Date of Patent: *Mar. 9, 2021

(54) MAINTAINING KEYS FOR TRUSTED BOOT CODE

(71) Applicant: Amazon Technologies, Inc., Seattle, WA (US)

(72) Inventors: Ron Diamant, Albany, CA (US); Alex Levin, Cupertino, CA (US); Ihab Bishara, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,742

(22) Filed: Feb. 10, 2020

(65) Prior Publication Data

US 2020/0175170 A1    Jun. 4, 2020

Related U.S. Application Data

(63) Continuation of application No. 15/389,152, filed on Dec. 22, 2016, now Pat. No. 10,565,382.

(51) Int. Cl.
*H04L 29/06* (2006.01)
*G06F 21/57* (2013.01)
*G06F 9/4401* (2018.01)
*H04L 9/08* (2006.01)

(52) U.S. Cl.
CPC .......... *G06F 21/575* (2013.01); *G06F 9/4403* (2013.01); *H04L 9/0861* (2013.01)

(58) Field of Classification Search
CPC .. G06F 21/554; G06F 2221/034; G06F 21/55; G06N 99/005

USPC .......................................................... 713/189
See application file for complete search history.

(56) References Cited

U.S. PATENT DOCUMENTS

| | | | |
|---|---|---|---|
| 2009/0070598 A1* | 3/2009 | Cromer ................. | G06F 21/575 713/193 |
| 2011/0314279 A1* | 12/2011 | Ureche ................. | H04L 9/3234 713/167 |
| 2015/0033336 A1* | 1/2015 | Wang ................. | H04L 63/0245 726/23 |

OTHER PUBLICATIONS

Arbaugh et al., "A Secure and Reliable Bootstrap Architecture," University of Pennsylvania Scholarly Commons, Department of Computer & Information Science, document marked Dec. 2, 1996, 10 pages.

(Continued)

*Primary Examiner* — Evans Desrosiers
(74) *Attorney, Agent, or Firm* — Klarquist Sparkman LLP

(57) ABSTRACT

Methods and apparatus are disclosed for securing executable code for execution with a processor using a trusted platform module (TPM). In one example of the disclosed technology, a method of decrypting executable code for execution includes measuring values stored in a CPU boot ROM and measuring second values for executable code stored in non-volatile memory, storing the resulting measurement value in a TPM platform configuration register. The PCR value is used to unseal a key stored in non-volatile memory of the TPM, which key is used to decrypt executable code for execution. Security can be further enhanced by destroying the values stored in the PCR by performing additional measurement operations with the TPM PCR used to generate the measurement value.

20 Claims, 8 Drawing Sheets

(56) References Cited

OTHER PUBLICATIONS

Challener, "An Introduction to programming the TPM," downloaded from https://www.cylab.cmu.edu/tiw/slides/challener-TPM.pdf on Dec. 19, 2016, 62 pages.
Parno, "The Trusted Platform Module (TPM) and Sealed Storage," downloaded from http://citeseerx.ist.psu.edu/viewdoc/download?doi=10.1.1.187.2027&rep=rep1, Jun. 21, 2007, 3 pages.
Rotkowska, "Thoughts about Trusted Computing," downloaded from http://invisiblethingslab.com/resources/misc09/trusted_computing_thoughts.pdf, document marked May 15, 2016, 150 pages.
Segall, "Using the TPM: Data Protection and Storage," downloaded from opensecuritytraining.info/IntroToTrustedComputing_files/Day2-2-data-storage.pdf on Nov. 9, 2016, 23 pages.
Segall, "Introduction to Trusted Computing: TPM 101," downloaded from opensecuritytraining.info/IntroToTrustedComputing_files/Day1-4-tpm101.pdf on Nov. 9, 2016, 46 pages.
Segall, "Using the TPM: Machine Authentication and Attestation," downloaded from opensecuritytraining.info/IntroToTrustedComputing_files/Day2-1-auth-and-att.pdf on Nov. 9, 2016, 46 pages.
Singer, "Introduction to Using the TSS," downloaded from https://www.trustedcomputinggroup.org/ .../Intro-to-Using-the-TSS-2005-11-07-1.pdf, document marked Nov. 7, 2005, 45 pages.
Tomlinson, "Introduction to the TPM," downloaded from http://courses.cs.vt.edu/cs5204/fall10-kafura-NVC/Papers/TPM/Intro-TPM-2.pdf on Nov. 15, 2016, 18 pages.

* cited by examiner

FIG. 3A

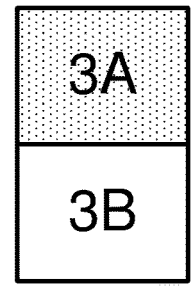

310

```
// seal password in TPM char password[20]="Bootloader password";

// Create PCR Object
result=Tspi_Context_CreateObject(hContext, TSS_OBJECT_TYPE_PCRS, 0, &hPcrs);
// Read value of PCR 7 and set the current value of PCR 7 for sealing
result=Tspi_TPM_PcrRead(hTPM, 7, &ulPcrLength, &rgbPcrValue);
result=Tspi_PcrComposite_SetPcrValue(hPcrs, 7, ulPcrLength, rgbPcrValue);
// Read value of PCR 9 and set the current value of PCR 9 for sealing
result=Tspi_TPM_PcrRead(hTPM, 9, &ulPcrLength, &rgbPcrValue);
result=Tspi_PcrComposite_SetPcrValue(hPcrs, 9, ulPcrLength, rgbPcrValue);

// Create an encrypted data object used for the seal operation.
result=Tspi_Context_CreateObject(hContext, TSS_OBJECT_TYPE_ENCDATA,
TSS_ENCDATA_SEAL, &hEncData);

result = Tspi_Policy_AssignToObject(hEncDataPolicy, hEncData);

// Seal the password using created data object hEncData
result = Tspi_Data_Seal(hEncData,hSRKey,strlen(password),password,hPcrs);
```

FIG. 3B

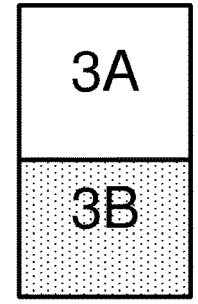

320

```
// Extend PCR register 15 value with a series of measurements define CODE_ADDRESS = 0x00100000;
define CODE_LENGTH = 0x100;
&measurement = CODE_ADDRESS;

for(i=0;i<code_length;i++) {
    value=measurement[i];
    result=Tspi_TPM_pcrExtend(hTPM,15,sizeof(value), (BYTE *)value, NULL,
result_length, &PCR_Value);
}
```

330

```
// set data object hRetrieveData to the value stored in array
encrypted_data
result=Tspi_SetAttribData(hRetrieveData,TSS_TSPATTRIB_ENCDATA_BLOB,
TSS_TSPATTRIB_ENCDATABLOB_BLOB, encrypted_data_length, encrypted_data);

// Unseal the data and place in string output
result=Tspi_Data_Unseal(hRetrieveData, hSRKey, &output_length,&output);
```

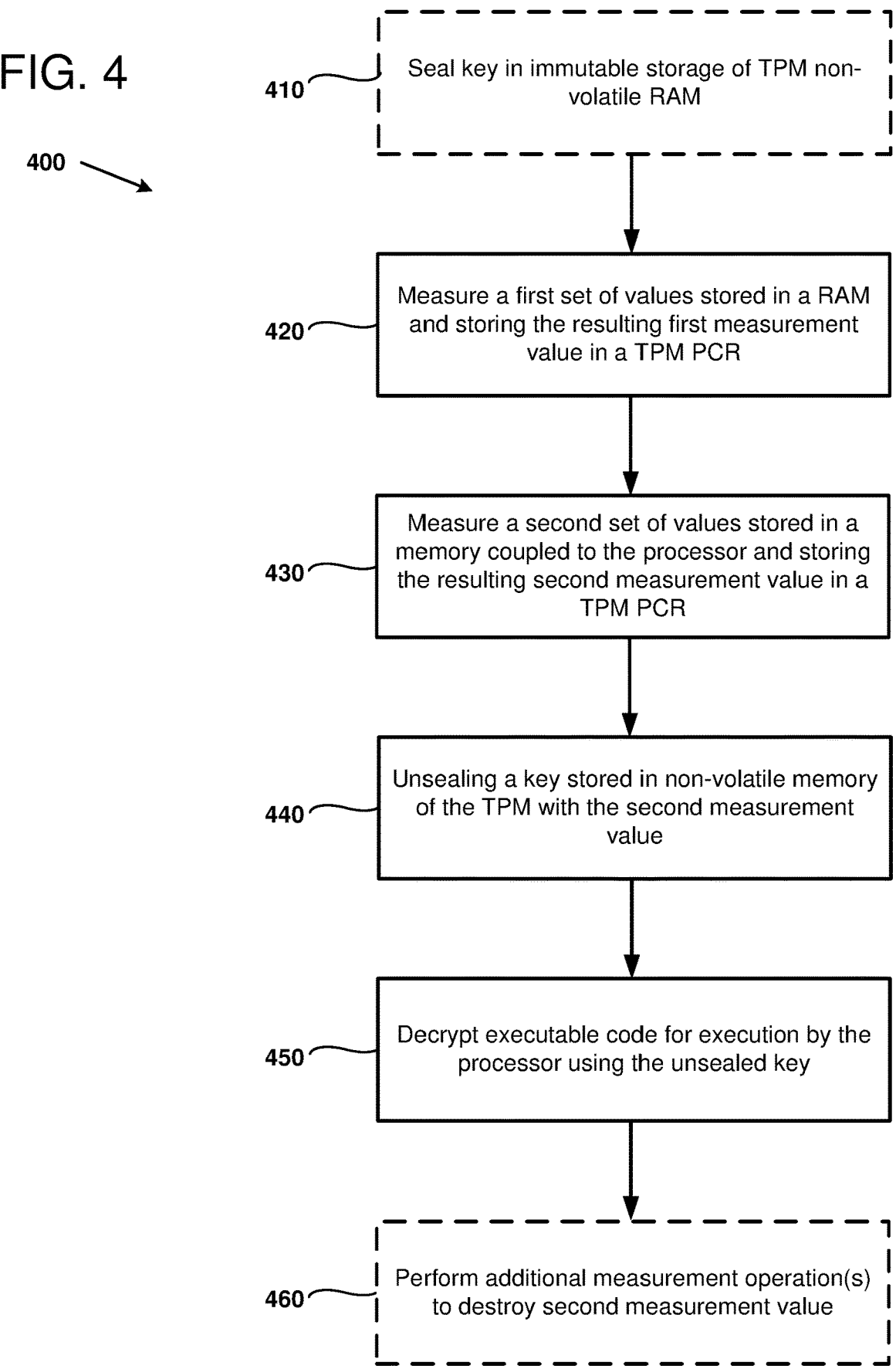

MAINTAINING KEYS FOR TRUSTED BOOT CODE

CROSS-REFERENCE TO RELATED APPLICATION

This application is a continuation of U.S. patent application Ser. No. 15/389,152, filed on Dec. 22, 2016, which is incorporated by reference herein.

BACKGROUND

Some processors provide built-in hardware support for trusted execution environment, which provides security by allowing some processes to execute in an isolated environment. Such processors provide hardware support for switching between processor execution domains to prevent data from being accessed from other processor execution domains. For example, such processors can be organized to provide normal execution domains, and trusted execution or secure domains to provide additional security features. For example, the processor can prevent normal execution domains from accessing data and other resources allocated to the secure domains. However, adoption of such technology has been limited. Accordingly, there is ample opportunity for improvement to computer security.

BRIEF DESCRIPTION OF THE DRAWINGS

FIGS. 3A and 3B illustrate code for performing TPM operations, as can be used in certain examples of the disclosed technology.

FIG. 4 is a flowchart outlining an example method of decrypting executable code using an unsealed key, as can be performed in certain examples of the disclosed technology.

DETAILED DESCRIPTION

Figure 1:
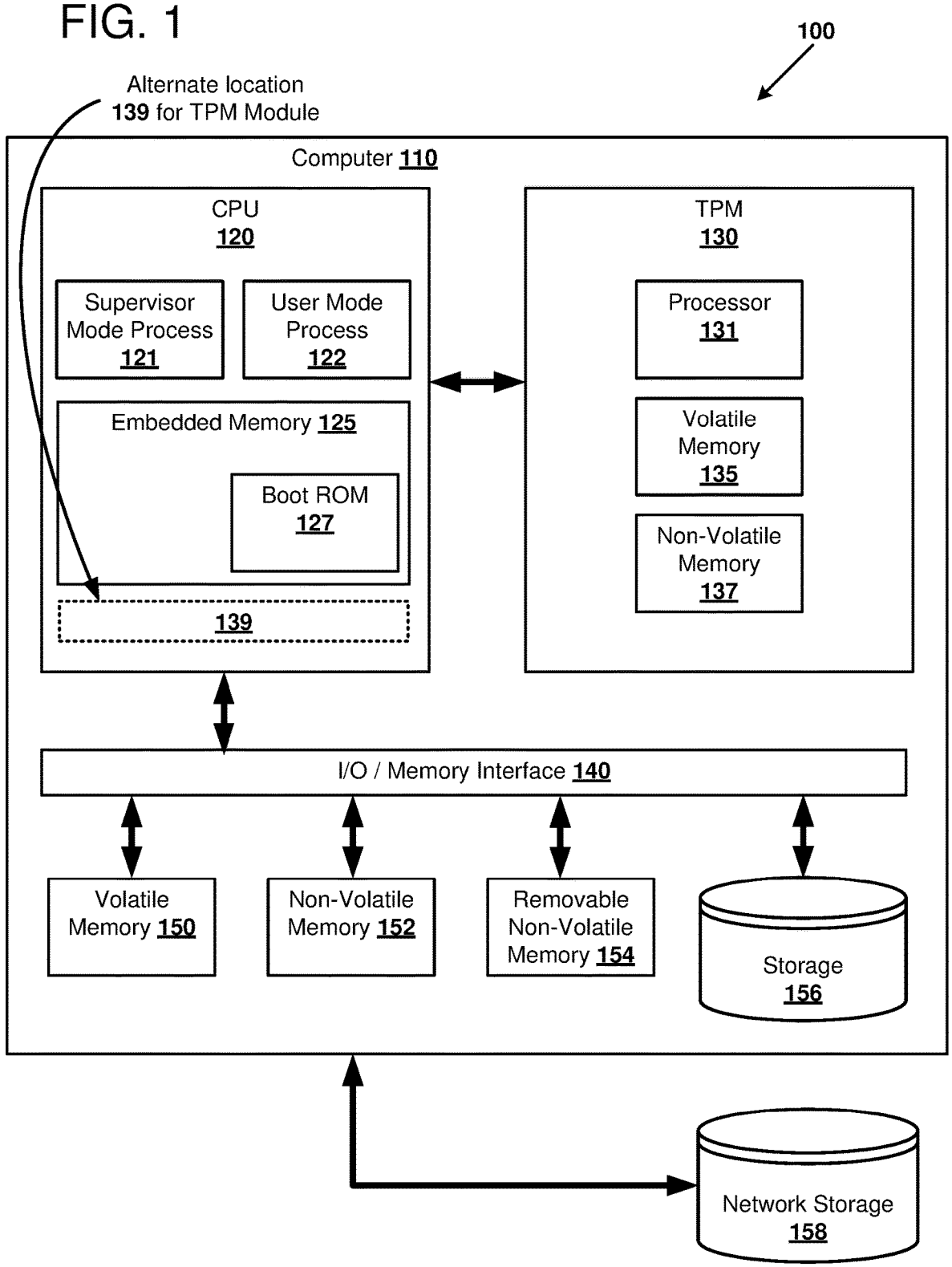
FIG. 1 is a block diagram of a computer with a trusted platform module (TPM), as can be used in certain examples of the disclosed technology.

Methods and apparatus are disclosed for securing decryption keys in a number of computing environments, including computing environments having access to a trusted platform module (TPM) that can be used to store and generate decryption keys. In some examples, a decryption key stored in the TPM is unsealed and can be used to provide secure boot by using the unsealed key to decrypt executable code executed by the computer during boot. Thus, security attacks that involve unauthorized tampering with executable code, such as surreptitious installation of root kits can be avoided. Such unauthorized code is often executed at boot time, and can avoid detection by traditional virus scanning or other security tools.

Some examples of the disclosed technology include one or more of three general concepts. The first concept involves adding a new boot stage executable that generates a decryption key by measuring executable code for a central processing unit (CPU) boot read-only memory (ROM) and a boot stage executable. A TPM is used to process measurement data generated for the executable code and thereby generate a decryption key used to decrypt subsequently executed code. The measurement data is stored within a platform configuration register (PCR) of the TPM, and PCR values are not directly observable outside the TPM itself. It should be noted that the "stored" measurement data is not directly stored within the PCR (a copy of the measurement data is not stored in the PCR), but rather the measurement data is combined with the current value stored in the PCR, and this combined value stored in the PCR, replacing the previously-stored value. The decryption key can be unsealed from the TPM using the measurement value stored in the TPM PCR. The measurement values can be generated by performing a sequence of hash operations with the executable code stored in a boot ROM and executable code of the new boot stage executable itself. The hash operation is selected such that even minor changes (e.g., changing a single bit) will result in a different measurement value and thus prevent unsealing of the decryption key. Further, the measurement value stored in the PCR can be destroyed by performing additional operations (e.g., additional extend operations) on the PCR, thereby destroying the measurement value, such that subsequent code executed by the processor cannot unseal the decryption key.

Protecting decryption keys, including decryption keys used to extract executable code can be difficult, especially in the absence of dedicated hardware. The disclosed technologies offer a way for CPUs lacking dedicated hardware support to offer protective keys to users by using an on-board TPM for this task. Many computers sold today include a TPM module that is provided as part of integrated circuit implementing a CPU, or as an additional module coupled to a CPU. The TPM can have a key written to its internal non-volatile memory during manufacture or production and sealed with PCR value(s) that capture the system state after running a number of measurement operations with boot executable code. Upon rebooting, the CPU can use the TPM to measure the boot code prior to or as it is executed, unseal the decryption key, use the key to decrypt executable code, delete the key, and destroy any measurement results in order to prevent access to the key by other code executing on the CPU.

During manufacturing, the decryption key can be written to the TPM's non-volatile memory and sealed with an expected boot code measurement result. The decryption key value should be known only to the manufacturer or other provider of the CPU. A new boot stage is provided that has limited functionality. This new boot stage can initialize the TPM, unseal and securely extract the key, use it to decrypt data or executable code, and jump to execute the next stage of boot. This new boot stage can be signed using a customer's private key and authenticated by BIOS or another root of trust block prior to execution. The new boot stage measures certain portions of the boot code before unsealing the key. Because only this new boot stage should lead to the expected measurement results, alterations made to the boot stage executable code will not result in the proper decryption key, thereby preventing an attacker from forging this new boot stage. After the extracted key is used, the TPM PCRs can be reset, and system information that could indicate the key, such as values stored on the system stack, are deleted before jumping to the next boot stage, in order to prevent subsequently executing code from accessing the key. As most PCRs do not support a reset function, the PCR value is destroyed or ruined by performing additional extend operations with predetermined values or random values in order to ensure that the PCR state is irreversibly changed and cannot be reverse engineered.

FIG. 1 is a block diagram 100 outlining an example computing environment in which certain examples of the disclosed technology can be implemented. For example, the illustrated computer 110 can be used to perform disclosed methods of securely building a computer including measuring executable code, unsealing an immutable key stored in TPM non-volatile storage, and decrypting executable code, as discussed further below. In some examples, additional portions of a key stored outside of a TPM can be combined in order to form a decryption key.

The illustrated computer 110 includes a central processing unit (CPU) 120 that can be used to execute software processes, including supervisor mode processes such as supervisor mode process 121 and user mode processes, such as user mode process 122. The CPU 120 includes various types of embedded memory 125 including boot ROM 127. The boot ROM 127 is typically physically masked into the CPU design, or programmed using fuses, and cannot be readily altered after the CPU 120 is manufactured. The boot ROM 127 is typically the first code that is executed by the CPU 120 upon initiating execution on boot.

As shown, the CPU 120 is coupled to a trusted platform module (TPM), and includes a number of components, including a processor 131, volatile memory 135, which can include one or more platform configuration registers (PCR), and non-volatile memory 137, which retains its state after turning off power to the memory. Suitable examples of non-volatile memory include non-volatile RAM (NVRAM), electrically erasable programmable read-only memory (EEPROM), and/or flash memory. Suitable examples of volatile memory include static RAM (SRAM), dynamic RAM (DRAM), registers, latches, flip-flops, or other suitable volatile memory components. A number of different types of TPMs can be used with the disclosed technologies including TPMs manufactured according to the TPM 1.2 standard or the TPM 2.0 standard as defined under the ISO/IEC 11889: 2009 or 11889:2015 standards, respectively. The TPM can provide a root of trust for both reporting and storage functions and can provide limited internal storage for storing data, keys, and for performing operations using PCRs. The PCRs cannot be directly read outside of the TPM. Instead, the PCRs can receive results generated by performing various cryptographic and/or hash functions, for example SHA-1 hashes. In some examples, other hash functions can be used, including SHA-2, SHA-3, RSA, or AES. Data can then be unsealed from the TPM by internally comparing or performing other arithmetic/logic functions with data stored in the PCR, which is combined with the stored key data that has been sealed within the TPM. TPMs may also provide other functions such as random number generation and cryptographic functions. While the examples used herein are explained with reference to the SHA-1 standard for ease of explanation, other suitable cryptographic standard can be employed within a TPM to implement disclosed methods.

As shown in FIG. 1, the TPM 130 is provided with a separate integrated circuit that is coupled via an electrical connection to the CPU 120. However, an alternate location 139 for the TPM is indicated where the TPM is provided as part of the integrated circuit implementing the CPU 120. The CPU 120 is further coupled to an I/O and memory interface 140 that controls access and provides data to and from a number of memory and I/O components including volatile memory 150, non-volatile memory 152, removable non-volatile memory 154, and mass storage 156. These storage devices are typically physically coupled to the computer 110. Further, data can also be stored in network storage 158, which is accessed via a wired or wireless network interface. In some examples, some or a portion of decryption keys and executable boot code can be stored in one or more of the storage devices coupled to the computer 110 and/or in network storage 158.

Figure 2:
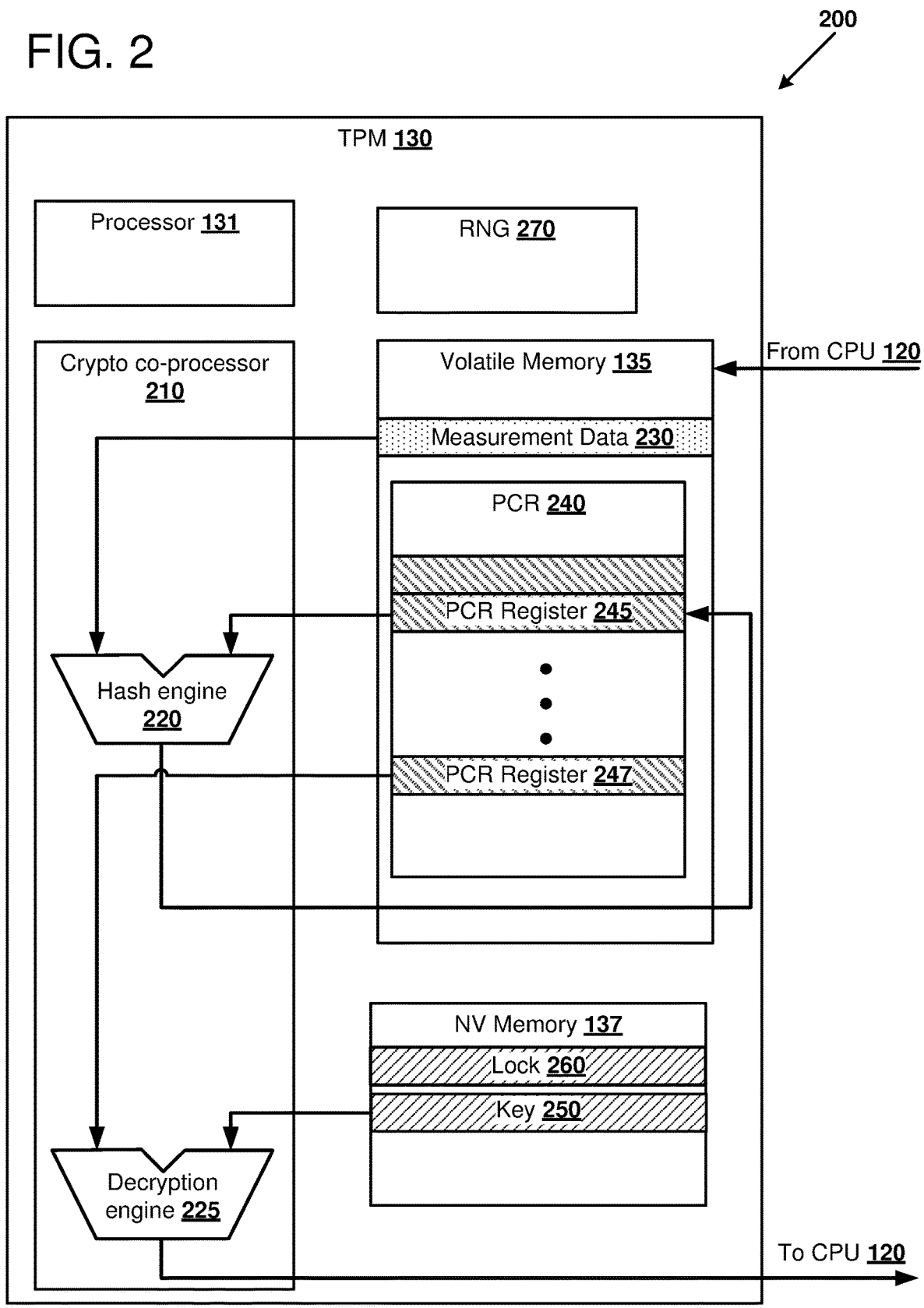
FIG. 2 is a block diagram of a TPM, as can be used in certain examples of the disclosed technology.

FIG. 2 is a block diagram 200 further detailing the TPM 130 discussed above regarding FIG. 1. As shown, the TPM 130 includes a general purpose processor 131 that is used to supervise execution of operations provided by the TPM. The TPM 130 further includes a cryptographic co-processor 210, which includes a hash engine 220 and a decryption engine 225. The hash engine 220 performs hash functions on data and stores the result within the TPM volatile memory 135. For example, an extend operation calculates a hash of two different input values producing a single result that can be stored within the TPM. An example extend operation can be expressed as:

$$PCR[n] \leftarrow hash(PCR[n]\|data)$$

where n is an index specifying a particular PCR register to update, ‖ indicates a concatenation operation, and hash is a hash function (e.g., SHA, AES, or RSA) that acts on the current value of a PCR register (PCR[n]) combined with input data by the concatenation operation.

A sealing operation is used to encrypt data K, which cannot be output by the TPM. A sealing operation can be expressed as:

$$seal(K,c) \rightarrow C$$

where K is the input data (e.g., a symmetric decryption key), $n_1$, $[n_2]$, $[n_3]$, . . . $[n_i]$ are indices designating one or more PCRs, and C is an output ciphertext. Similarly, an unsealing operation used to decrypt a value can be expressed as:

$$unseal(C,n_1,[n_2],[n_3], \ldots [n_i]) \rightarrow K$$

For certain disclosed examples, the ciphertext C is stored in non-volatile RAM of the TPM. The plaintext K is key that can be used to decrypt data and/or instructions stored in memory coupled to the CPU. However, the plaintext K will only be correctly retrieved from the TPM if the PCR value(s) PCR[$n_1$], PCR[$n_2$], etc. are set to the same values that were used to seal in the input data. Otherwise, no data, or incorrect data, is returned.

As shown, the volatile memory 135 includes measurement data 230 that is received from the CPU. For example, executable code and/or data values associated with boot operations can be used to generate measurement data that is temporarily stored in the TPM volatile memory 135 and provided to the hash engine 220 as the data input. The volatile memory 135 further includes a plurality of PCR registers within a PCR unit 240. For example, for TPMs adapted to performing SHA-1 operations, the PCR registers each store a 20-byte value. As shown in FIG. 2, a value stored in PCR register 245 is used as a second input for the hash engine 220 to be combined with the measurement data 230. The resulting hash output is then written back to the same PCR register 245. Thus, by performing a series of extend operations combining the measurement data with the preceding values in the PCR register, measurement values can be derived for a block of executable code that is difficult to tamper with, as even small changes to the code will result in different PCR values, rendering the key unsealable. In some examples, measurement data is stored in two PCR registers (e.g., PCR register 245 and PCT register 247) and both registers must be set to properly seal or unseal data. In some examples, the measurement data stored in one PCR register (e.g., PCR register 245) is compared to a value stored in the non-volatile memory 137, and the TPM 130 allows access to the sealed data only if the PCR and non-volatile memory data matches. In other examples, data stored in the PCR is used to perform a decryption operation that then provides access to the sealed key.

The non-volatile memory 137 can be implemented using any suitable circuit technology (e.g., using PROM, EEPROM, flash, NVRAM, or other suitable storage) that can retain data after the TPM 130 is powered off. As shown, the non-volatile memory 137 is storing a decryption key 250 that can only be unsealed when suitable values from the PCR 240 (e.g., by setting PCR register 245 or 247) are applied to the decryption engine 225 along with the encrypted key 250. The data stored for the encrypted key 250 can be locked to prevent overwriting or erasing the key by storing a value in a designated lock 260 portion of the non-volatile memory 137. By setting the lock, the TPM will prevent further writes to the locked portions of the non-volatile memory 137. In some examples, a lock can be set by setting fuses.

The illustrated TPM 130 further includes a random number generator (RNG) 270, which can be used to generate random numbers for use by the TPM.

FIGS. 3A-3B illustrate three portions 310, 320, and 330 of pseudocode further detailing aspects of sealing, extending, and unsealing operations, as can be used to implement certain examples of the disclosed technology.

Code portion 310 illustrates an example of pseudocode for sealing a value in a TPM according to the disclosed technology. In particular, the pseudocode creates a PCR object (data structure) named hPCRs. The illustrated PCR object includes two PCR registers, PCR register 7 and PCR register 9. An encrypted data object hEncData is generated for performing the seal operation, and the value of the string "password" is sealed using the encrypted data object.

Code portion 320 illustrates an example of pseudocode for extending a series of values in a PCR register. In particular, a portion of length 0x100 (CODE_LENGTH) words of data stored at memory address 0x00100000 (CODE_ADDRESS) are sequentially used to extend the value stored in PCR register 15. For example, computer-executable instructions stored at the CODE_ADDRESS are concatenated with the current PCR register value, hashed, and stored back to PCR register 15.

Code portion 330 illustrates an example of pseudocode for unsealing data stored in a TPM. As shown, an object is initialized, and the unencrypted data will be stored in the array "output" once the data has been unsealed. The code portion 330 is executed after setting one or more PCR registers to an appropriate state using a series of extend operations.

FIG. 4 is a flow chart 400 outlining an example method of producing an unsealed decryption key, as can be performed in certain examples of the disclosed technology. For example, the illustrated method can be performed using the computer outlined above in FIGS. 1 and 2.

At process block 410, a key is sealed in immutable storage of TPM non-volatile RAM. In some examples, the manufacturer of a CPU or TPM unit provides a secret key that is sealed in the immutable storage. The key is sealed using measurement values for executable code that is executed during boot of the respective computer, for example, executable code stored in the CPU boot ROM 127. The sealing operation takes as input (1) the key and (2) the measurement data that will be produced by measuring the executable as inputs, and stores the key in the immutable storage. For example, the TPM can be configured to compare the measurement data stored in a PCR and only provide the key if the measurement data matches previously stored data within the TPM. In other examples, the key is encrypted and stored in memory using the measurement data as an encryption key. In some examples, a fuse or lock is programmed after sealing the key, in order to prevent any further changes to the key stored in the non-volatile RAM. In the examples disclosed herein, the key is a symmetric encryption key, although in other examples, the technology can be adapted to store an asymmetric encryption key.

At process block 420, a first set of values stored in a RAM is measured and the resulting first measurement value is stored in a PCR of the TPM. For example, by measuring a first portion of executable code stored in boot ROM (which is an example of a non-writeable RAM) by performing a series of extend operations on the executable code to a first platform configuration register (PCR) of the TPM, a first measurement value is produced. Boot ROM coupled or contained within a CPU can be measured and the resulting value stored in the TPM PCR. Typically, the first set of values includes the machine code for executable code that is stored in the RAM. The values are measured by performing a series of extend operations on the executable code and designating one of the TPM PCRs to store the resulting measurement values. For each extend operation, the previous PCR value is combined with an additional measurement value and restored in the same PCR. Thus, a unique measurement value will be associated with any particular set of executable RAM code.

In some examples, the CPU of the system under boot executes internal firmware, microcode, executes a special-purpose instruction, or uses a finite state machine to measure the first set of values stored in the boot ROM. In other examples, the instructions of the boot ROM itself include instructions for causing the first set of values to be measured and the result to be stored in a PCR of the TPM.

In some examples, the PCR of the TPM is initialized prior to measuring. Some TPMs include a PCR that can be reset to a reset value. In other examples, the TPM PCRs can be "reset" after the system is powered down or reset. In some examples, one PCR register is used, while in other examples, two or more PCR registers are used.

At process block 430, a second set of values stored in memory coupled to the CPU are measured and the resulting second measurement value is stored in the same TPM PCR that was used for process block 420. For example, a second portion of executable code stored in a nonvolatile memory is measured by performing a series of extend operations on the first portion of executable code to the first PCR, thereby producing a second measurement value. Thus, in order to recreate the measurement values, the previous set of first values are used to generate a measurement that is then used as a starting point for producing a second set of measurement data for the second set of values. For example, the second set of values can correspond to machine-executable code for a next boot stage to be executed by the computer. By measuring the first set of values and the second set of values and placing the result in the designated TPM PCR, the PCR value is now ready to unseal the key that was previously stored in immutable storage at process block 410.

At process block 440, a key stored in non-volatile memory of the TPM is unsealed using the current second measurement value generated at process block 430. The unsealing operation combines the second measurement value stored in the TPM PCR with the key stored in immutable storage and produces a key that is an output of the TPM. This unsealed key (e.g., a decryption key) can be used to decrypt other executable code or data accessible to the computer. In some examples, the key is an immutable key that cannot be readily modified after the CPU is manufactured. In some examples, the unsealing includes decrypting the key using SHA-1, SHA-2, SHA-3, RSA, or AES. In some examples, the sealed key is a decryption key stored in a portion of the TPM non-volatile memory that is not directly readable by the processor.

At process block 450, executable code for execution by the CPU is decrypted using the unsealed key generated a process block 440. In some examples, the decryption uses a similar technique as was used to unseal the key (e.g., SHA-1, SHA-2, SHA-3, RSA, or AES).

At process block 460, one or more additional measurement operations are performed designating one or more of the TPM PCRs used to generate the measurement values. The effect of performing these additional measurement operations (e.g., an extend operation) is to make subsequent unsealing of the key extremely difficult. This is because the key can only be read when the PCR values match the PCR values used when sealing the key. A predetermined value such as all zeroes or other pattern of numbers, a random value, a time stamp, or other suitable value can be used to perform additional TPM extend operations. The effect of performing these additional operations is that the second measurement value cannot be recovered from the TPM PCR. Thus, other code executed on the processor cannot access the second measurement value, thereby keeping the second measurement value and the associated decryption key secret.

In some examples of the disclosed technology, the second portion of software, which can be executed immediately after the boot ROM executes, is used to manage the outlined method, including initiating and managing the TPM, including directing the disclosed measurement and unsealing operations. In some examples, the boot ROM authenticates the second portion of software before transferring control to the second portion of software. The second portion of software can, for example, authenticate a third portion of boot code used to continue the boot process, for example, by authenticating system BIOS or UEFI (User Extensible Firmware Interface) code. In some examples, the second portion of software further decrypts the BIOS/UEFI code and transfers control to the code.

In some examples, software code can be authenticated by comparing an unsealed key with data stored with the first portion of software and/or the second portion of software. For example, authenticating code executed by the processor to perform the measuring can compare an unsealed key to one or more values stored with the authenticating code. For example, a compare instruction followed by a conditional branch is then used to jump to the next portion of code during the boot process. In some examples, this next portion of code causes decryption of the further subsequent portions of code. The comparison data can be stored immediately after the jump instruction in the authenticating code, or at any other suitable location for storing such comparison data. In some examples, the comparison data can be encoded within immediate fields of the authenticating code itself. In some examples, one or more portions of the software code are executable to cause the processor to perform at least a portion of operations for authenticating and/or decrypting code.

Figure 5:
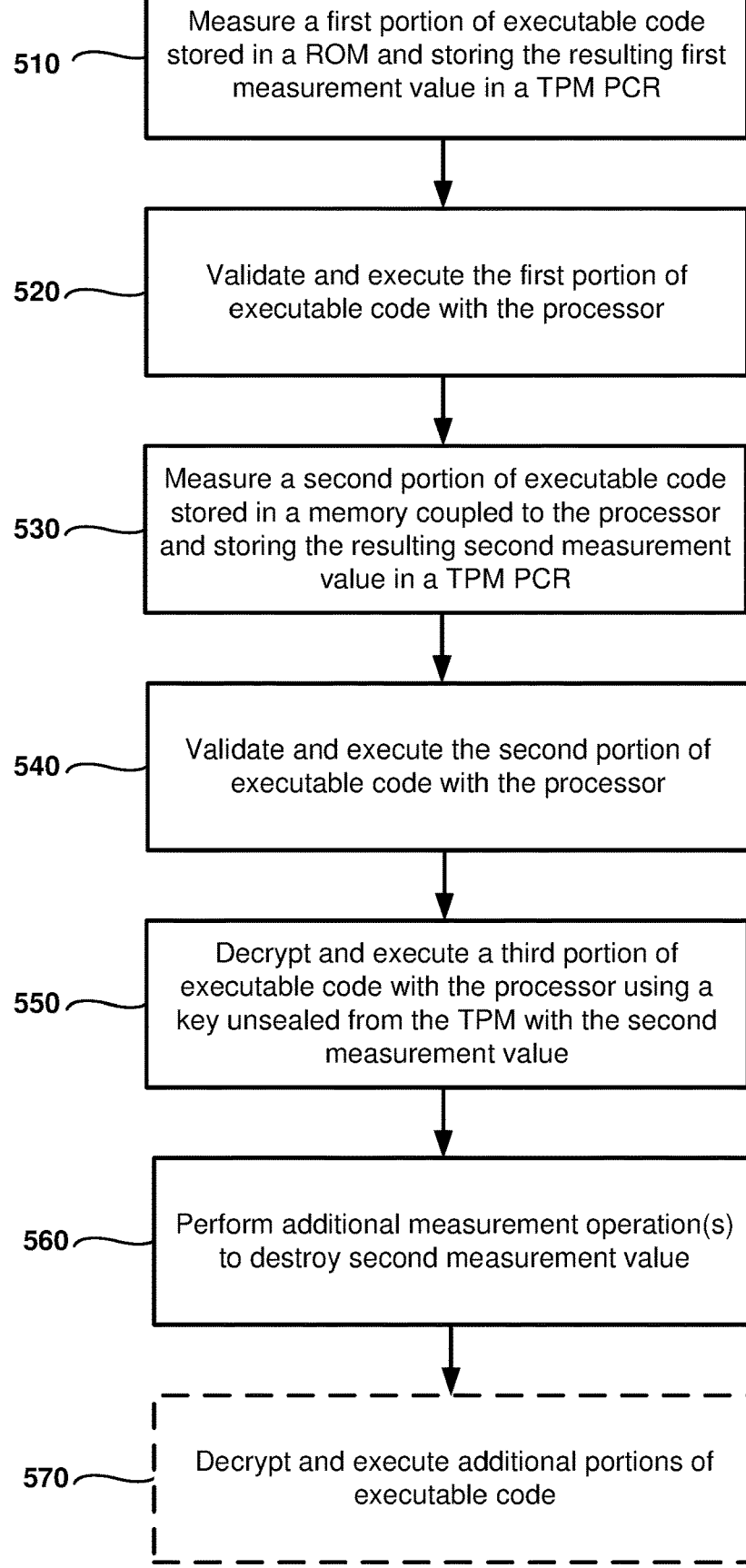
FIG. 5 is a flowchart outlining an example method of decrypting and executing code using a key unsealed from a TPM, as can be performed in certain examples of the disclosed technology.

FIG. 5 is a block diagram 500 outlining an example method of booting a computer using executable code that has been secured using certain examples of the disclosed technology. For example, the computer 110 described above regarding FIG. 1, can be used to perform the illustrated method of secure boot.

At process block 510, a first portion of executable code stored in a RAM is measured and the resulting first measurement value is stored in a TPM PCR. For example, an immutable RAM executable code can be measured by performing a number of extend operations using the executable code as input.

At process block 520, the first portion of executable code that was measured at process block 520 is validated and executed with the CPU. The validating can include comparing the resulting first measurement value to an expected measurement value. In some examples, the validating consists of determining that decrypted code for the first portion of executable code is valid (e.g., contains only legal machine instructions). The first portion of executable code is executed in order to initiate boot of the host computer.

At process block 530, a second portion of executable code stored in a memory coupled to the process is measured and the resulting second measurement value is stored in a TPM PCR. For example, the second portion of executable code can be measured by performing a series of extend operations using the TPM PCR. In some examples, the first measurement value, the second measurement value, or both measurement values are generated by performing a hash operation that includes a one-way symmetric cryptographic function.

At process block 540, the second portion of executable code is validated and executed with a processor. The code can be validated in a similar fashion as was performed for the first portion of executable code at process block 520.

At process block 550, a third portion of executable code is decrypted and executed with the processor using a key that is unsealed from the TPM using the second measurement values stored in the TPM PCR at process block 530. Thus, the third portion of executable code cannot be decrypted unless the first measurement values and the second measurement values correspond to unmodified executable code that was used to generate the decryption key. After the third portion of executable code is decrypted, the decryption key should be erased from memory locations that may contain the key or other information that can be used to determine the key. For example, steps can be taken to erase information that was pushed onto the system stack that may include the decryption key. In some examples, certain portions of memory can be searched for the decryption key and any matches can be erased so that other processes cannot access the decryption key.

At process block 560, additional measurement operations are performed with the TPM in order to destroy the second measurement value remaining in the TPM PCR. For example, by performing an extend operation with a predetermined value, a time stamp, a random value, or other suitable value, the value stored in the PCR is destroyed and cannot be used by subsequent processes.

At process block 570, additional portions of executable code can be decrypted and executed in a similar fashion to the operations performed at process blocks 550 and 560. For example, the third portion of executable code can be used to access additional decryption keys stored in memory or in TPM memory and use the key in order to decrypt and execute the additional portions.

In some examples, one or more of the first, second, and/or third portions of executable code can be authenticated prior to execution by comparing an unsealed key with stored data. For example, authenticating code executed by the processor to perform the measuring can compare an unsealed key to one or more values stored with the authenticating code. For example, a compare instruction followed by a conditional branch is then used to jump to the next portion of code during the boot process. In some examples, this next portion of code causes decryption of the further subsequent portions of code. The comparison data can be stored immediately after the jump instruction in the authenticating code, or at any other suitable location for storing such comparison data. In some examples, the comparison data can be encoded within immediate fields of the authenticating code itself. In some examples, one or more of the first, second, and/or third portions of executable code cause the processor to perform at least a portion of operations for authenticating and/or decrypting code.

Figure 6:
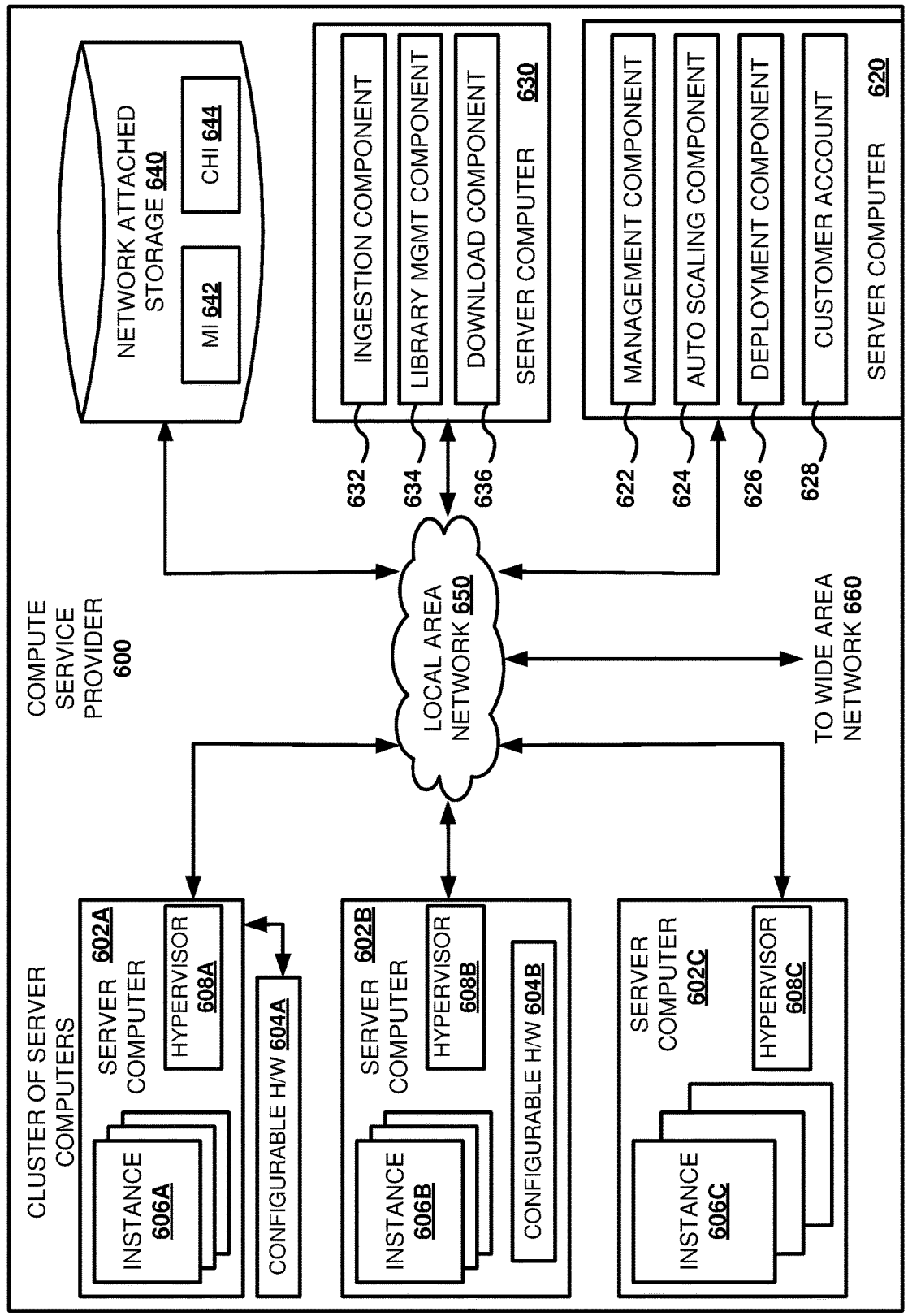
FIG. 6 is an example system diagram showing a plurality of virtual machine instances running in a multi-tenant environment including a logic repository service.

FIG. 6 is a computing system diagram of a network-based compute service provider 600 that illustrates one environment in which examples described herein can be used. By way of background, the compute service provider 600 (e.g., a cloud services provider) is capable of delivery of computing and storage capacity as a service to a community of end recipients. In some examples, the compute service provider can be established for an organization by or on behalf of the organization. That is, the compute service provider 600 may offer a "private cloud environment." In another example, the compute service provider 600 supports a multi-tenant environment, wherein a plurality of customers operate independently (e.g., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some examples, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602C. Each of the server computers 602A-602C can include a CPU and TPM, such as those discussed above regarding FIGS. 1-4. While only three server computers are shown, any number can be used, and large centers can include thousands of server computers. The server computers 602A-602C can provide computing resources for executing software instances 606A-606C. In one example, the software instances 606A-606C are virtual machines. As known in the art, a virtual machine is an instance of a software implementation of a machine (i.e. a computer) that executes applications like a physical machine. In the example of a virtual machine, each of the servers 602A-602C can be configured to execute a hypervisor 608 or another type of program configured to enable the execution of multiple software instances 606 on a single server. Additionally, each of the software instances 606 can be configured to execute one or more applications. Further, each of the servers 602A-602C can be configured to securely boot by employing the methods discussed above regarding FIGS. 5-7, including recovering a decryption key unsealed from a TPM.

It should be appreciated that although the examples disclosed herein are described primarily in the context of virtual machines, other types of instances can be utilized with the concepts and technologies disclosed herein. For instance, the technologies disclosed herein can be utilized with storage resources, data communications resources, and with other types of computing resources. The examples disclosed herein might also execute all or a portion of an application directly on a computer system without utilizing virtual machine instances.

The server computers 602A-602C can include a heterogeneous collection of different hardware resources or instance types. Some of the hardware instance types can include configurable hardware that is at least partially configurable by a user of the compute service provider 600. One example of an instance type can include the server computer 602A which is in communication with configurable hardware 604A. Specifically, the server computer 602A and the configurable hardware 604A can communicate over a local interconnect such as PCIe. Another example of an instance type can include the server computer 602B and configurable hardware 604B. For example, the configurable logic 604B can be integrated within a multi-chip module or on the same die as a CPU of the server computer 602B. Yet another example of an instance type can include the server computer 602C without any configurable hardware. Thus, hardware instance types with and without configurable logic can be present within the resources of the compute service provider 600.

One or more server computers 620 can be reserved for executing software components for managing the operation of the server computers 602 and the software instances 606. For example, the server computer 620 can execute a management component 622. A customer can access the management component 622 to configure various aspects of the operation of the software instances 606 purchased by the customer. For example, the customer can purchase, rent or lease instances and make changes to the configuration of the software instances. The configuration information for each of the software instances can be stored as a machine image (MI) 642 on the network-attached storage 640. Specifically, the MI 642 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 644 which is to be loaded on configurable hardware 604 when the instance is launched. The CHI includes configuration data for programming or configuring at least a portion of the configurable hardware 604.

The customer can also specify settings regarding how the purchased instances are to be scaled in response to demand. The management component can further include a policy document to implement customer policies. An auto scaling component 624 can scale the instances 606 based upon rules defined by the customer. In one example, the auto scaling component 624 allows a customer to specify scale-up rules for use in determining when new instances should be instantiated and scale-down rules for use in determining when existing instances should be terminated. The auto scaling component 624 can consist of a number of subcomponents executing on different server computers 602 or other computing devices. The auto scaling component 624 can monitor available computing resources over an internal management network and modify resources available based on need.

A deployment component 626 can be used to assist customers in the deployment of new instances 606 of computing resources. The deployment component can have access to account information associated with the instances, such as who is the owner of the account, credit card information, country of the owner, etc. The deployment component 626 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 626 can utilize the customer-provided configuration and cache logic to configure, prime, and launch new instances 606. The configuration, cache logic, and other information may be specified by a customer using the management component 622 or by providing this information directly to the deployment component 626. The instance manager can be considered part of the deployment component.

Customer account information 628 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 630 can be reserved for executing software components for managing the download of configuration data to configurable hardware 604 of the server computers 602. For example, the server computer 630 can execute a logic repository service comprising an ingestion component 632, a library management component 634, and a download component 636. The ingestion component 632 can receive host logic and application logic designs or specifications and generate configuration data that can be used to configure the configurable hardware 604. The library management component 634 can be used to manage source code, user information, and configuration data associated with the logic repository service. For example, the library management component 634 can be used to store configuration data generated from a user's design in a location specified by the user on the network-attached storage 640. In particular, the configuration data can be stored within a configurable hardware image 644 on the network-attached storage 640. Additionally, the library management component 634 can manage the versioning and storage of input files (such as the specifications for the application logic and the host logic) and metadata about the logic designs and/or the users of the logic repository service. The library management component 634 can index the generated configuration data by one or more properties such as a user identifier, an instance type, a marketplace identifier, a machine image identifier, and a configurable hardware identifier, for example. The download component 636 can be used to authenticate requests for configuration data and to transmit the configuration data to the requestor when the request is authenticated. For example, agents on the server computers 602A-B can send requests to the download component 636 when the instances 606 are launched that use the configurable hardware 604. As another example, the agents on the server computers 602A-B can send requests to the download component 636 when the instances 606 request that the configurable hardware 604 be partially reconfigured while the configurable hardware 604 is in operation.

The network-attached storage (NAS) 640 can be used to provide storage space and access to files stored on the NAS 640. For example, the NAS 640 can include one or more server computers used for processing requests using a network file sharing protocol, such as Network File System (NFS). The NAS 640 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 650.

The network 650 can be utilized to interconnect the server computers 602A-602C, the server computers 620 and 630, and the storage 640. The network 650 can be a local area network (LAN) and can be connected to a Wide Area Network (WAN) 660 so that end users can access the compute service provider 600. It should be appreciated that the network topology illustrated in FIG. 6 has been simplified and that many more networks and networking devices can be utilized to interconnect the various computing systems disclosed herein.

Figure 7:
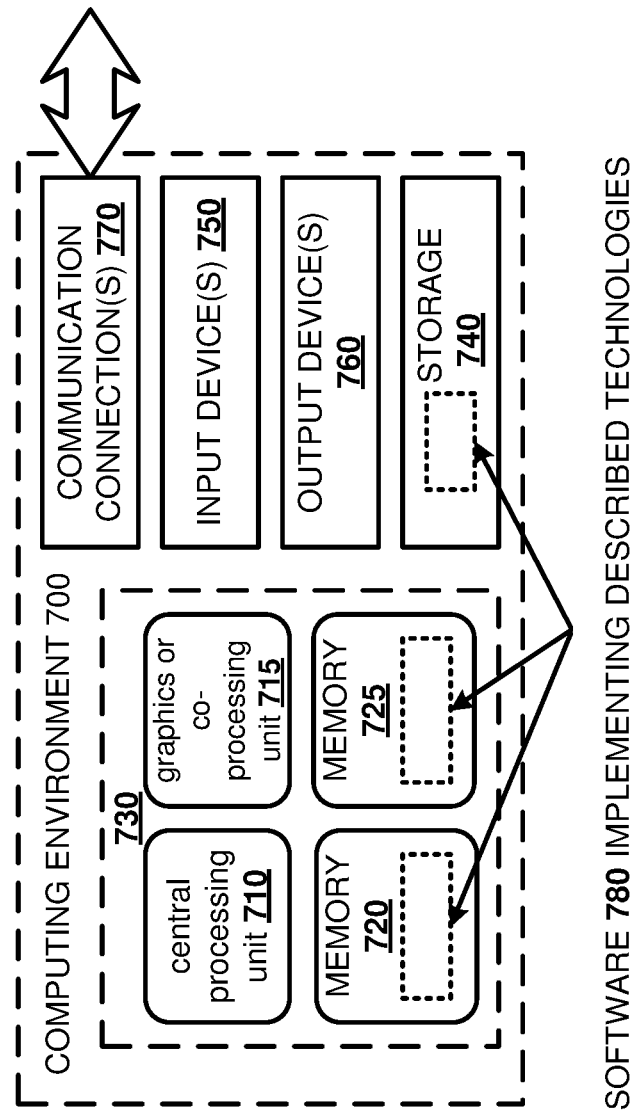
FIG. 7 depicts a generalized example of a suitable computing environment in which certain described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. For example, the co-processing unit 715 can be a TPM, such as the TPM described above regarding FIG. 2. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed examples can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed examples, alone and in various combinations and subcombinations with one another. The disclosed methods, apparatus, and systems are not limited to any specific aspect or feature or combination thereof, nor do the disclosed examples require that any one or more specific advantages be present or problems be solved.

In view of the many possible examples to which the principles of the disclosed technology may be applied, it should be recognized that the illustrated examples are only preferred examples and should not be taken as limiting the scope of the claims. Rather, the scope of the claimed subject matter is defined by the following claims. We therefore claim as our invention all that comes within the scope of these claims.

What is claimed is:

1. A method of securely booting a computer, the computer comprising a processor coupled to computer memory and a trusted platform module (TPM), the method comprising:
   executing, by the processor, a first portion of executable code stored in a boot ROM of the computer memory;
   executing, by the processor, a second portion of executable code stored in nonvolatile memory of the computer memory;
   storing, by the TPM, a first measurement value based on the first portion of executable code;

storing, by the TPM, a second measurement value based on the first measurement value and the second portion of executable code;
unsealing, by the TPM, an encryption key using the second measurement value and a key stored by the TPM;
decrypting, by the processor using the unsealed encryption key, a third portion of executable code stored in the computer memory; and
executing, by the processor, the third portion of executable code.

2. The method of claim 1, further comprising:
validating the first portion of executable code before executing the first portion of executable code.

3. The method of claim 1, further comprising:
validating the second portion of executable code before executing the second portion of executable code.

4. The method of claim 1, wherein the encryption key is unsealed by combining the second measurement value and the key stored by the TPM.

5. The method of claim 1, wherein the key stored by the TPM key is an immutable key not directly readable by the processor.

6. The method of claim 1, further comprising:
storing, by the TPM after unsealing the encryption key, a third measurement value based on a predetermined value.

7. The method of claim 1, wherein the second portion of executable code is executed immediately after executing the first portion of executable code.

8. The method of claim 1, wherein the first measurement value and the second measurement value are stored in one or more platform configuration registers (PCRs) of the TPM.

9. The method of claim 1, wherein the first measurement value and the second measurement value are generated by performing a series of hash operations.

10. The method of claim 9, wherein the series of hash operations comprises:
generating the first measurement value by combining first measurement data and a preexisting value stored by the TPM; and
generating the second measurement value by combining second measurement data and the first measurement value stored by the TPM.

11. A method of securely booting a computer, the computer comprising a processor coupled to computer memory and a trusted platform module (TPM), the method comprising:
executing, by the processor, a first portion of executable code stored in a boot ROM of the computer memory
authenticating, by the processor, a second portion of executable code stored in the computer memory;
executing, by the processor, the authenticated second portion of executable code;
measuring, by the processor for storing a first measurement value in the TPM, the first portion of executable code;
measuring, by the processor for storing a second measurement value in the TPM, the second portion of executable code, wherein the second measurement value is in part based on the first measurement value;
unsealing, by the TPM, an encryption key using the second measurement value;
decrypting, by the processor using the unsealed encryption key, a third portion of executable code; and
executing, by the processor, the decrypted third portion of executable code.

12. The method of claim 11, further comprising:
destroying, by the TPM after unsealing the key, the second measurement value.

13. The method of claim 12, wherein destroying the second measurement value comprises storing a third measurement value in the TPM based on a predetermined value.

14. The method of claim 11, further comprising:
authenticating, by the processor, the decrypted third portion of executable code.

15. The method of claim 11, wherein the encryption key is unsealed by combining the second measurement value and an immutable key stored by the TPM.

16. An apparatus, comprising:
a processor;
a trusted platform module (TPM) coupled to the processor, the TPM comprising:
a plurality of platform configuration registers (PCRs);
non-volatile memory configured to store an immutable key;
a hash engine configured to:
store a first measurement value in a selected one of the plurality of the PCRs by applying a hash function to combine a first measurement received from the processor and the existing value stored in in the selected one of the plurality of the PCRs; and
store a second measurement value in the selected one of the plurality of the PCRs by applying a hash function to combine second measurement received from the processor and the existing value stored in in the selected one of the plurality of the PCRs; and
a decryption engine configured to unseal the immutable key using the second measurement value stored in the selected one of plurality of the PCRs; and
memory or storage devices coupled to the processor and storing computer-executable instructions that, when executed by the processor, cause the processor to:
signal the TPM to store the first measurement value;
signal the TPM to store the second measurement value;
signal the TPM to unseal and provide the unsealed immutable key to the processor; and
decrypt and execute boot code stored in the memory or storage devices coupled to the processor.

17. The apparatus of claim 16, wherein the immutable key is written to the non-volatile memory during manufacture or production.

18. The apparatus of claim 16, wherein the computer-executable instructions are stored in a boot ROM of the memory or storage devices coupled to the processor.

19. The apparatus of claim 16, wherein the computer-executable instructions are stored in internal firmware of the memory or storage devices coupled to the processor.

20. The apparatus of claim 16, wherein the boot code is decrypted if the first measurement value and the second measurement value correspond to unmodified executable code used to generate the immutable key.

* * * * *

UNITED STATES PATENT AND TRADEMARK OFFICE
CERTIFICATE OF CORRECTION

| | |
|---|---|
| PATENT NO. | : 10,943,013 B2 |
| APPLICATION NO. | : 16/786742 |
| DATED | : March 9, 2021 |
| INVENTOR(S) | : Diamant et al. |

It is certified that error appears in the above-identified patent and that said Letters Patent is hereby corrected as shown below:

In the Claims

<u>Column 16,</u>
Line 36, "stored in in the" should be --stored in the--

Signed and Sealed this
Tenth Day of October, 2023

*Katherine Kelly Vidal*

Katherine Kelly Vidal
*Director of the United States Patent and Trademark Office*